United States Patent
Lei et al.

(10) Patent No.: US 10,419,916 B1
(45) Date of Patent: Sep. 17, 2019

(54) METHOD AND APPARATUS FOR MULTI-NETWORK SIMULTANEOUS EMERGENCY CALLING

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/152,033

(22) Filed: Oct. 4, 2018

(51) Int. Cl.
| | |
|---|---|
| *H04W 4/90* | (2018.01) |
| *H04W 48/18* | (2009.01) |
| *H04W 76/20* | (2018.01) |
| *H04W 4/40* | (2018.01) |
| *H04W 76/15* | (2018.01) |
| *H04W 88/06* | (2009.01) |

(52) U.S. Cl.
CPC ............... *H04W 4/90* (2018.02); *H04W 4/40* (2018.02); *H04W 48/18* (2013.01); *H04W 76/15* (2018.02); *H04W 76/20* (2018.02); *H04W 88/06* (2013.01)

(58) Field of Classification Search
CPC ..... H04W 4/046; H04W 4/90; H04W 84/005; H04W 76/10; H04W 60/04; H04W 8/20; H04W 4/44; H04W 4/50; H04W 4/80; H04W 76/50; H04W 4/38; H04W 68/00; H04W 76/34; H04W 88/022; H04W 88/025; H04W 88/06; H04L 51/38; H04L 65/1069; H04L 65/1073; H04L 69/40
See application file for complete search history.

(56) References Cited

U.S. PATENT DOCUMENTS

| | | | |
|---|---|---|---|
| 8,874,070 B2 | 10/2014 | Basore et al. | |
| 9,154,636 B2* | 10/2015 | Seymour | G08B 25/004 |
| 9,736,791 B1 | 8/2017 | Ameixieira | |
| 9,756,583 B2 | 9/2017 | Hwang et al. | |
| 2012/0258705 A1* | 10/2012 | Wisnewski | H04W 4/046 |
| | | | 455/423 |
| 2015/0217711 A1* | 8/2015 | Kawada | B60R 21/00 |
| | | | 701/31.5 |
| 2016/0087655 A1* | 3/2016 | Kim | H04W 4/90 |
| | | | 455/404.1 |
| 2016/0135028 A1* | 5/2016 | Choi | H04W 24/08 |
| | | | 455/404.1 |
| 2016/0277079 A1* | 9/2016 | Fikar | H04B 7/15507 |
| 2017/0135136 A1* | 5/2017 | Lei | H04M 1/7253 |
| 2018/0063882 A1 | 3/2018 | Macdonald et al. | |

* cited by examiner

*Primary Examiner* — Kwasi Karikari
(74) *Attorney, Agent, or Firm* — Frank Lollo; Brooks Kushman P.C.

(57) ABSTRACT

A system includes a processor configured to determine availability of multiple cellular network connectivity via a multi-network cellular modem, responsive to detecting a reportable incident. The processor is also configured to place a plurality of simultaneous emergency calls, one on each available connectivity option, via the modem, responsive to the determination of multiple option availability.

17 Claims, 4 Drawing Sheets

METHOD AND APPARATUS FOR MULTI-NETWORK SIMULTANEOUS EMERGENCY CALLING

TECHNICAL FIELD

The illustrative embodiments generally relate to methods and apparatuses for multi-network simultaneous emergency calling.

BACKGROUND

When a vehicle is in an accident and a passenger cannot call for assistance, it is useful for a vehicle to call emergency services on behalf of the passenger. Vehicle sensor systems are capable of detecting collisions, airbag deployments, and even biometric rhythms. Vehicles can further be equipped to work in conjunction with medical devices worn by a user, which can allow a computer of the vehicle to become aware of a variety of health-threatening situations.

A vehicle may use a connected device, such as a cellular phone, to place a call. Some vehicle telematics units may be provided with an onboard cellular modem, allowing the vehicle to make an emergency call even in the absence of a cellular device connected to the vehicle.

While such calls in the past would to simply connect to emergency services for verbal communication with an occupant, these calls and connections can also now be used to send vehicular data and accident related data. This information can help a public safety access point (PSAP) operator maximize response efficiency by receiving a more complete understanding of the ongoing situation.

SUMMARY

In a first illustrative embodiment, a system includes a processor configured to determine availability of multiple cellular networks via a multi-connectivity cellular modem, responsive to detecting a reportable incident. The processor is also configured to place a plurality of simultaneous emergency calls, one on each available network, via the modem, responsive to the determination of multiple network availability.

In a second illustrative embodiment, a method includes placing a plurality of simultaneous calls on a plurality of networks of a multi-connectivity cellular modem, responsive to detecting a vehicle emergency. The method also includes determining that two of the calls have connected and selecting one of the two calls as a voice call and the other as a data transfer call, based on measured characteristics of the two networks over which the two calls were placed meeting predefined thresholds.

In a third illustrative embodiment, a non-transitory computer readable storage medium, stores instructions that, when executed by a processor, cause the processor to perform the method including placing simultaneous emergency calls over multiple networks of a multi-network cellular modem. The method also includes detecting that a first of the simultaneous emergency calls has been connected and dropping all connected calls other than the first connected call responsive to detecting that the first call has been connected.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
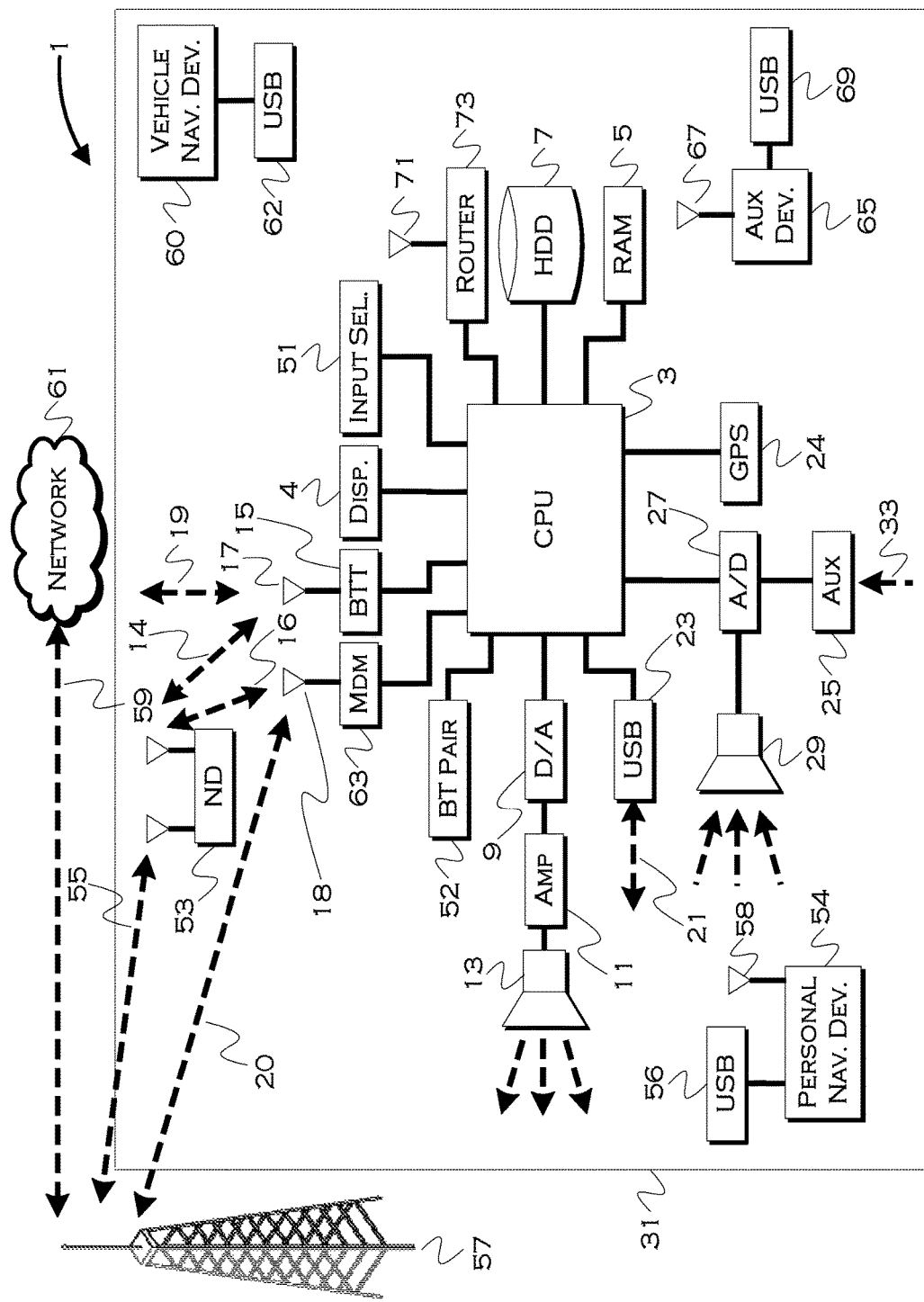
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication. The on-board modem may also include a multi-connectivity modem configured to place calls on a variety of available networks, including the capability to place simultaneous calls on different available networks.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

When an incident occurs in a vehicle that can impact the health or safety of an occupant, response time for the occupant to receive assistance can often be important. These incidents can include, for example, accidents, medical conditions, and other scenarios where automatic dialing of emergency services can be useful. In the illustrative embodiments, in order to maximize a likelihood of connection to a service for requesting assistance, and in order to provide a multi-pipe solution for data and voice, if desired, the process can use multiple networks of a multi-connectivity modem (dual network/dual-connectivity in the examples) to place separate, simultaneous emergency calls.

If either call is unsuccessful, or if one call connects, the occupant or operator can disconnect the other call. On the other hand, if both calls connect, the operator can elect to use one network for data transfer and the other network for voice communication. This arrangement can speed up data transfer and/or allow large file transfer without interrupting voice communication between the occupant and the service rendering assistance.

Figure 2:
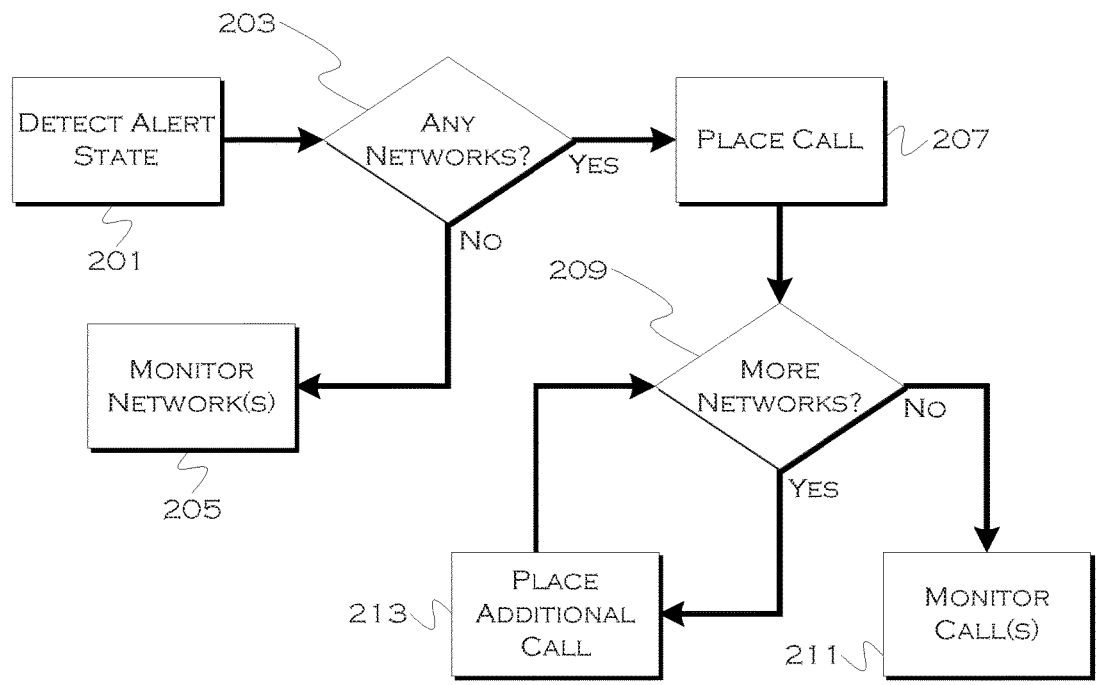
FIG. 2 shows an illustrative process for multi-connectivity calling.

FIG. 2 shows an illustrative process for multi-network/connectivity calling. In this example, the process determines 201 that an alert state has occurred. This can be the result of, for example, communication with an occupant-worn device or detection of a crash or collision via vehicle sensors. In still other examples, the occupant may push a button indicative of an emergency state for which assistance is required.

The process then communicates with an onboard multi-connectivity modem to determine 203 if there are any available cellular networks. In this example, a dual-network 4G/5G modem is contemplated, but the concept works for any multi-connectivity modem through which simultaneous calls can be placed using different networks. If the modem indicates that there are no networks currently available, the process will continue to monitor 205 for network-availability.

If there is an available connectivity option, the process can use the network to place 207 an emergency call. This is the first call on a network, and if more networks are available 209, the process can use those networks to place 213 additional simultaneous emergency calls on behalf of the occupant. The process can then monitor 211 the ongoing calls for dropped calls, requested drops or bifurcation of data/voice requests, among other things.

Figure 3:
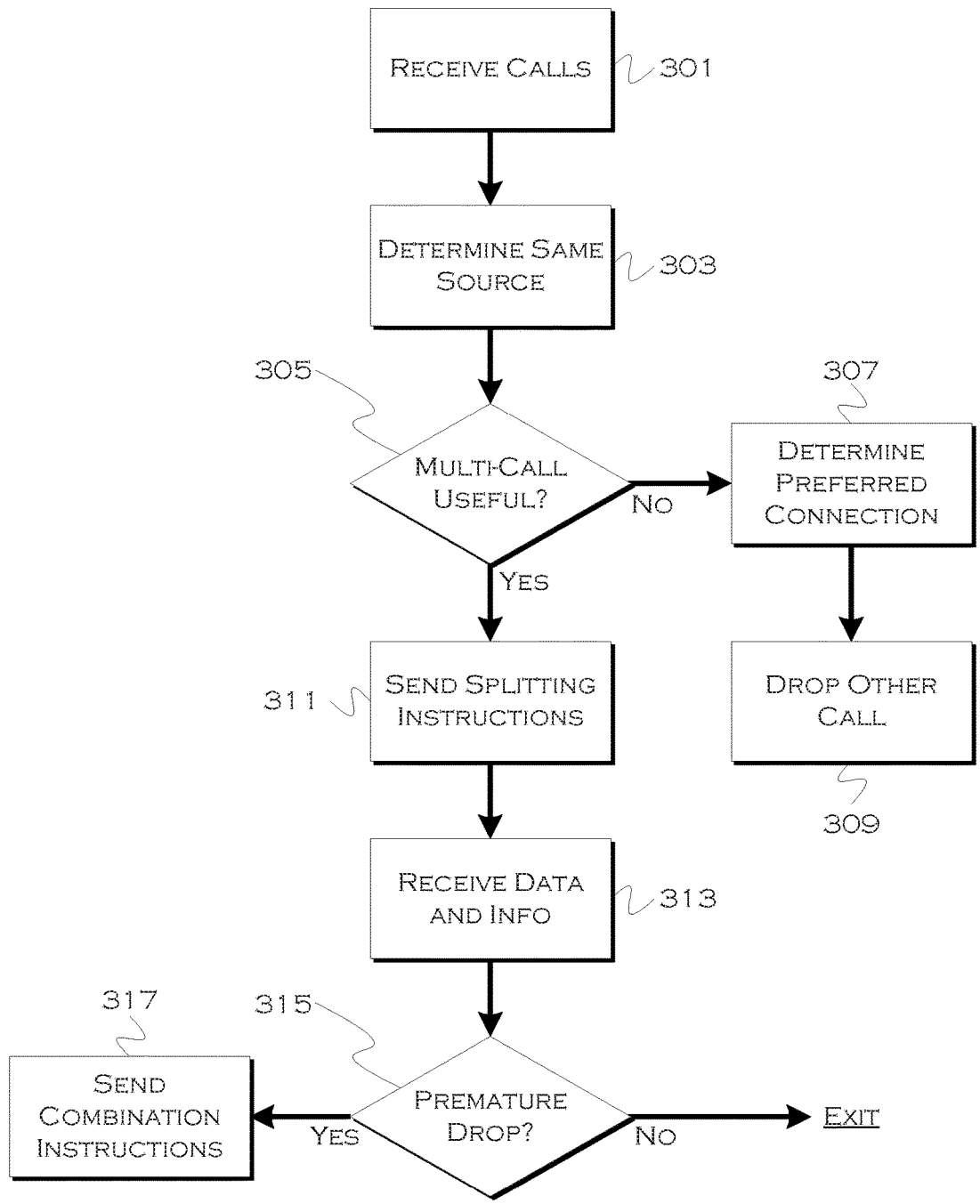
FIG. 3 shows an illustrative process for multi-connectivity call handling.

FIG. 3 shows an illustrative process for multi-connectivity call handling. In this example, the process operates at a remote call-handling site, such as a public safety access point (PSAP). The process receives 301 multiple calls and determines 303 that those calls originated from the same source and/or relate to the same incident. This can include, for example, examining packet data associated with a call and/or determining that one or more origin phone numbers correlate to a single vehicle.

If the process has received multiple calls relating to the same incident, and determines 305 that there is no particular use or need for multiple calls to be maintained, the process can determine 307 a preferred connection and drop 309 the other call. This can also include instructing a vehicle to drop a given call (so the vehicle identifies the drop as intentional) and/or instructing the vehicle to identify a preferred call and drop the other call(s).

If the process finds a need or use for multiple calls, such as, for example, both calls being on a tenuous connection (which may be indicated by signal strength received with regards to each call or a vehicle otherwise indicating that the connections are tenuous) or one call being useful for voice and one for data transfer, the process can send 311 instructions to bifurcate the calls into a data call and voice call.

The vehicle can responsively split the utility of the calls, and send data over a preferred data network and voice over a preferred voice network. This can also include a determination, made by the vehicle or PSAP, about which is more important, and a higher-strength connection may be used to preserve the more important aspect, in case the other aspect is dropped due to low signal strength. That is, just because a channel, such as 5G, may be better for data transfer, if data transfer is most important and the 5G signal is weak, 4G may be used for data transfer in order to increase the likelihood of completion.

If the service detects 315 a pre-emptive drop (or if the vehicle detects the drop) before the use of the network is completed, the process can send 317 instructions to either combine the two functions into one network, or to give preference on the remaining networks(s) to the higher priority information.

Figure 4:
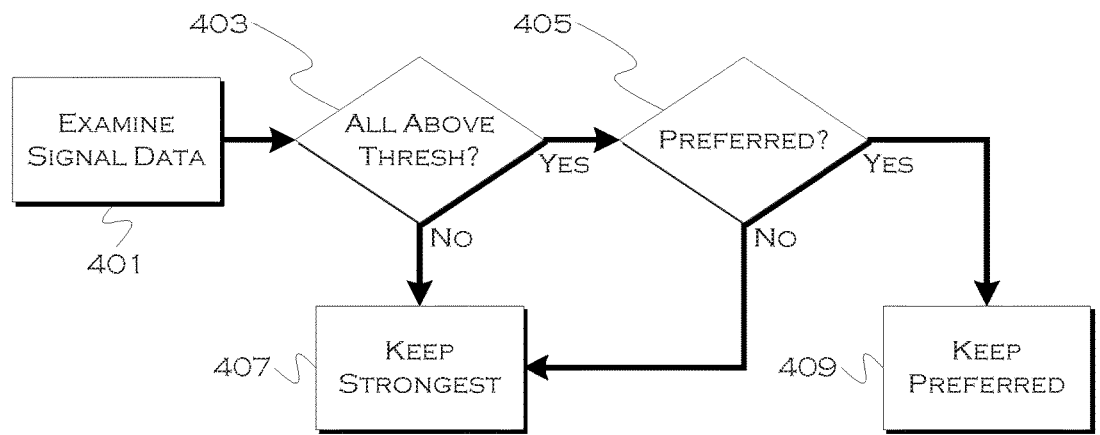
FIG. 4 shows an illustrative process for a call preservation strategy.

FIG. 4 shows an illustrative process for a call preservation strategy. In this example, the process attempts to determine the "best" connectivity option for a given purpose. The process examines 401 the signal strength data associated with each connected call on a given connectivity option. If the calls are all above a threshold for "minimum strength" 403, the process can determine if there is a preferred network for the intended purpose.

For example, if the process is attempting to transfer data, the process may determine that all networks are above the threshold strength, and elect to prefer the higher bandwidth 5G for the data transfer. Similarly, the process may elect 4G for a voice call, as the likelihood of persistence may be higher, and the higher 5G bandwidth may not be needed (or can be preserved for data if requested). If the process has a preferred connectivity for the function, the process can keep 409 the preferred call on the preferred connectivity connected.

If the process does not have a preferred connectivity, or if some or all of the networks are below the threshold minimum, the process may instead elect to keep 407 the strongest connection. That connectivity may still be above the minimum threshold, or it may be the strongest of a plurality of networks below the minimum threshold. The process can execute to select different networks for different purposes, and preferences related to one function (e.g., voice) may vary from those related to another (e.g., data transfer).

Figure 5:
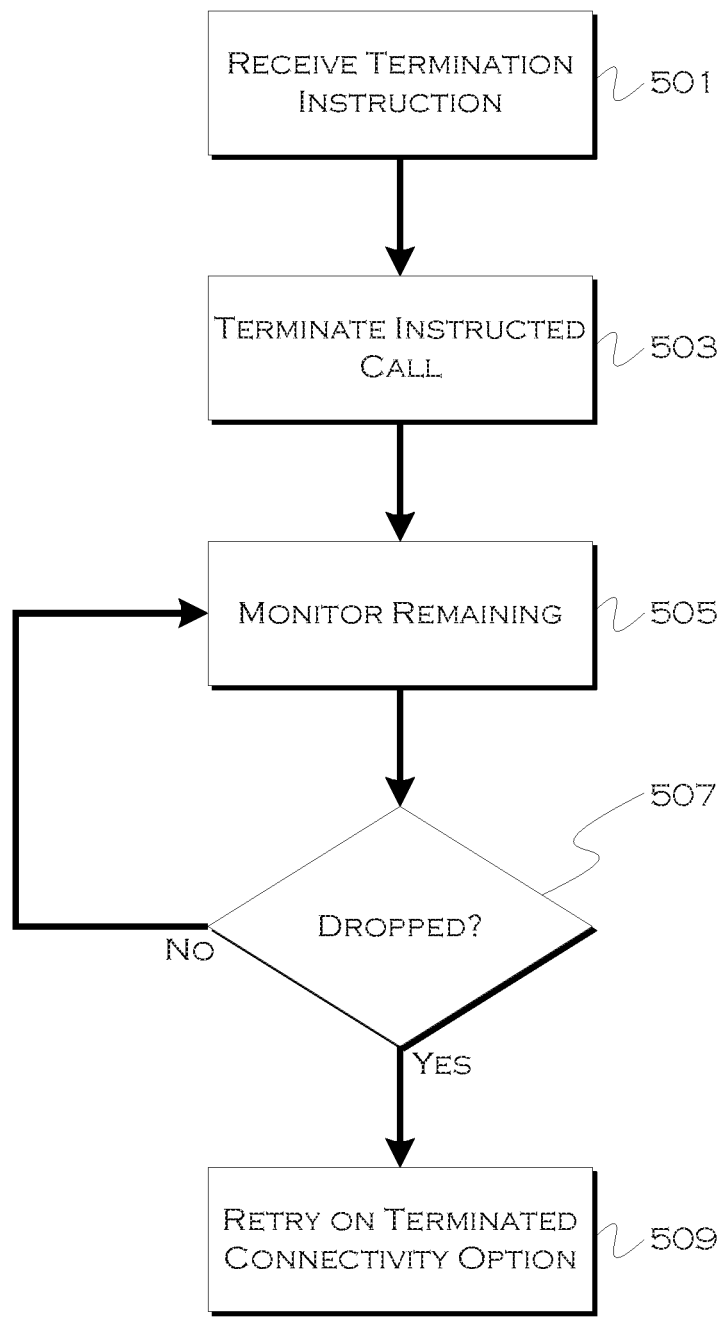
FIG. 5 shows an illustrative re-calling process for handling a dropped emergency call.

FIG. 5 shows an illustrative re-calling process for handling a dropped emergency call. In this example, the process may receive 501 a termination instruction for an ongoing call. This can either be an instruction to terminate the call, or an instruction to select a connectivity option for termination. The process may responsively terminate the appropriate call, and then may monitor 505 the remaining call(s).

Since the process "knows" that the terminated option was able to connect, at least initially, the process can use this information if a maintained-option call is dropped, due to decreased signal strength, for example. If the preserved call drops 507, the process can either attempt to re-establish the call using the dropped connectivity option or immediately retry 509 the call using the other, previously-working option. This allows the process to react to changing connectivity availability based on knowledge about what networks were previously functional.

By using simultaneous calls over multiple networks, the illustrative concepts and embodiments provide opportunities to improve the utility and functionality of emergency call placing and handling. The novel, uncommon and atypical examples and concepts described herein demonstrate potential improvements achievable through use of those examples, concepts, and the like.

The system can improve connectivity, response time and data transfer rates, while also improving the ability of a PSAP to maintain a voice connection while maximizing data transfer. In this manner, the system marks an improvement to the traditional single-call system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine availability of multiple cellular connectivity options via a multi-network cellular modem, responsive to detecting a reportable incident;
responsive to the determination of multiple connectivity availability, place a plurality of simultaneous emergency calls, one on each available connectivity option, via the modem; and
offer a responding emergency operator an option to bifurcate a call such that one of the plurality of simultaneous emergency calls becomes a data call and a second of the plurality of simultaneous emergency calls becomes a voice call.

2. The system of claim 1, wherein the processor is further configured to use one of the multiple calls as a data call and one of the multiple calls as a voice call responsive to receipt of an election from the emergency operator to bifurcate the call.

3. The system of claim 2, wherein the processor is configured to choose to utilize one of the plurality of simultaneous emergency calls having a higher bandwidth than another of the plurality of simultaneous emergency calls as the data call, and the another call as the voice call.

4. The system of claim 2, wherein the processor is configured to use a call having a higher signal strength than another call as the voice call and the another call as the data call.

5. The system of claim 2, wherein the processor is configured to, responsive to disconnection of one of the voice call or the data call, use the other of the voice call or data call for both data and voice communication.

6. The system of claim 2, wherein the processor is configured to detect premature disconnection of the voice call and switch the data call to the voice call responsive to the premature disconnection.

7. The system of claim 6, wherein the switch of the data call to the voice call is responsive to receipt of a request from the emergency operator.

8. The system of claim 2, wherein the processor is configured to detect premature disconnection of the data call and switch the voice call to the data call responsive to the premature disconnection.

9. The system of claim 6, wherein the switch of the voice call to the data call is responsive to receipt of a request from the emergency operator.

10. A method comprising:
responsive to detecting a vehicle emergency, placing a plurality of simultaneous calls on a plurality of networks of a multi-network cellular modem;
determining that two of the calls have connected; and
selecting one of the two calls as a voice call and the other as a data transfer call, based on measured characteristics of the two networks over which the two calls were placed meeting predefined thresholds.

11. The method of claim 10, wherein the measured characteristic of one of the two networks meets a predefined signal strength threshold and wherein the one of the two networks is chosen air the voice call.

12. The method of claim 10, wherein the measured characteristic of one of the two networks meets a predefined signal strength threshold and wherein the one of the two networks is chosen for the data call.

13. The method of claim 10, wherein the measured characteristic of one of the two networks meets a predefined bandwidth threshold and wherein the one of the two networks is chosen for the data call.

14. The method of claim 10, wherein the selecting is responsive to a request from the emergency operator to provide a separate voice and data channel.

15. The method of claim 10, further comprising detecting premature disconnection of one of the voice call or data call and using the other of the voice call or data call for both data and voice responsive to the premature disconnection.

16. The method of claim 10, further comprising detecting premature disconnection of the voice call and switching the data call to the voice call responsive to the premature disconnection.

17. The method of claim 10, further comprising detecting premature disconnection of the data call and switching the voice call to the data call responsive to the premature disconnection.

* * * * *